Figure 1:
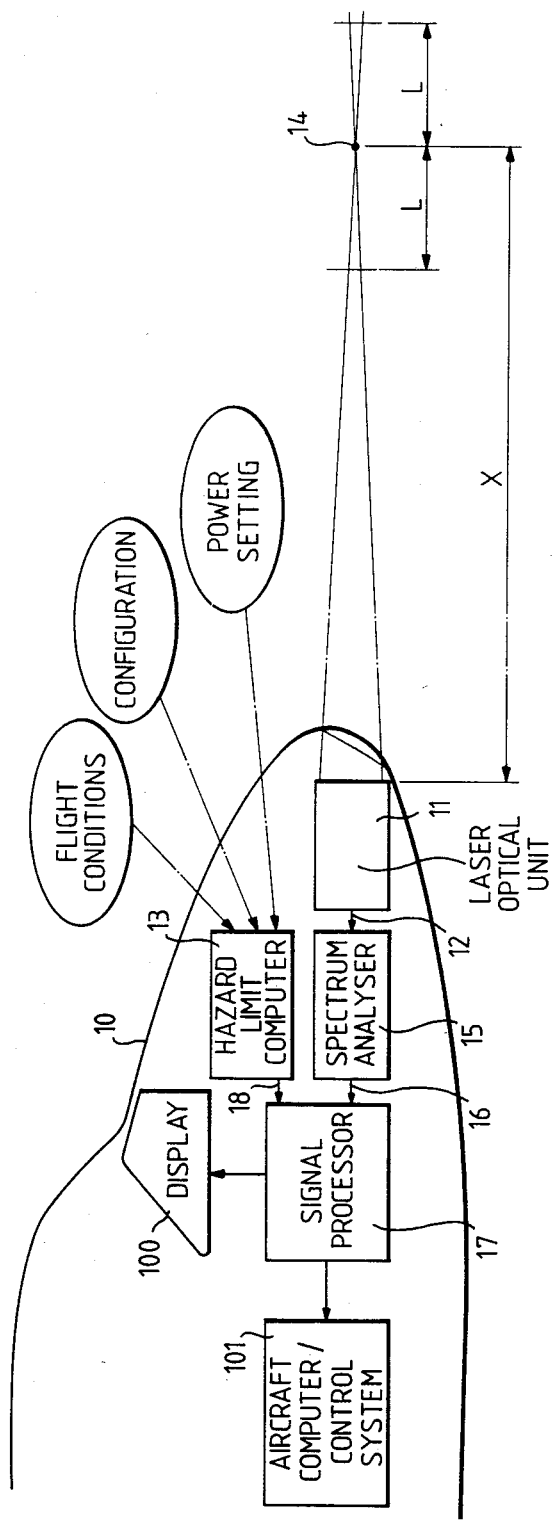

United States Patent [19]

Woodfield

[11] Patent Number: 4,585,341
[45] Date of Patent: Apr. 29, 1986

[54] WIND SHEAR DETECTION

[75] Inventor: Alan A. Woodfield, Bedford, England

[73] Assignee: National Research Development Corporation, London, England

[21] Appl. No.: 508,531

[22] Filed: Jun. 28, 1983

[30] Foreign Application Priority Data

Jul. 2, 1982 [GB] United Kingdom ................. 8219119

[51] Int. Cl.[4] ........................ G01P 3/36; G01N 21/00
[52] U.S. Cl. .................................... 356/28.5; 356/342
[58] Field of Search .................... 356/28.5, 342, 337, 356/346

[56] References Cited

U.S. PATENT DOCUMENTS

| 3,856,402 | 12/1974 | Low et al. | 356/28.5 |
| 3,984,685 | 10/1976 | Fletcher et al. | 356/28.5 |
| 3,984,686 | 10/1976 | Fletcher et al. | 356/28.5 |
| 4,167,329 | 9/1979 | Jelalian et al. | 356/28.5 |
| 4,359,640 | 11/1982 | Geiger | 356/342 |
| 4,483,614 | 11/1984 | Rogers | 356/28.5 |

FOREIGN PATENT DOCUMENTS 0009533  4/1980  European Pat. Off. .

OTHER PUBLICATIONS

A. J. Hughes et al., "Long Range Anemometry Using a $CO_2$ Laser," *Opto-Electronics*, vol. 4, pp. 379–384, 1972.
B. LeBoss, "News Update," *Electronics*, vol. 50, No. 6, p. 8.
"Effet Doppler et Laser pour Detector les Turbulences," *Mesures–Regulation–Automatisme*, 9/81, p. 63.

*Primary Examiner*—S. C. Buczinski
*Assistant Examiner*—Linda J. Wallace
*Attorney, Agent, or Firm*—Cushman, Darby & Cushman

[57] ABSTRACT

An apparatus for the early detection of oncoming wind shear, without false indications arising through turbulence. A forward looking laser speed sensor (11) provides a signal (12) containing information on air velocity over a range of distances about a measurement distance (X). This is subject to spectrum analysis (15), to identify all velocities present in a time sample of the signal (12). These velocities are further processed (17) to establish the air velocity at substantially the measurement distance (X), and the highest and lowest velocities present over a distance range (L). A time sequence of results is combined to provide a wind shear hazard level for comparison with a hazard level limit computed (13) from the prevailing conditions.

10 Claims, 4 Drawing Figures

WIND SHEAR DETECTION

This invention relates to wind shear detection and apparatus for wind shear detection.

Aviation is affected by changes of wind velocity in a number of ways. Rapid small changes in wind shake the aircraft and produce disturbances in angular attitude without much effect on the aircraft's path through the air. These wind changes are usually referred to as turbulence. Larger changes in wind which affect the aircraft's path through the air, and in particular changes in wind which cause significant perturbations to an aircraft's rate of descent, are referred to as wind shear. In extreme conditions wind shear can cause aircraft to crash into the ground, or even break aircraft structure.

The response of aircraft to wind shear is related to both the total change of wind velocity and its rate of change with time. A combination of a large total velocity change and a high rate of change results in a high hazard level. Much effort is devoted to the forecasting and avoidance of wind shear at present using mainly meteorological techniques. These meteorological techniques have provided only limited assistance in avoiding or safely penetrating wind shears. Some airborne systems utilising normally available sensors on aircraft have also been used. Although providing some benefits, they only detect any wind shear after the aircraft encounters it, and dangerous height excursions can result from delays of even a few seconds in responding to the presence of wind shear. A factor which causes delay in identifying wind shear is the difficulty of distinguishing between dangerous wind shear and turbulence without a time delay to test that a high rate of change of wind is associated with a large total change in wind.

Apparatus has been developed including a forward looking sensor which is capable of measuring air velocity by reflection of laser light from particles present in the air. Such apparatus may use focussed continuous wave or pulsed lasers and in both cases the air velocity can be measured in regions well ahead of the sensor and give advance warning of wind velocity changes before such changes reach the location of the sensor. The velocity measurement is not precisely identified with a given distance ahead of the sensor.

According to the present invention, wind shear detection apparatus includes a forward looking laser air speed sensor providing a signal containing information on air velocity over a range of distance about a measurement distance, a spectrum analyser to identify all velocities present in a time sample of the signal, means for determining the air velocity at substantially the measurement distance, means for determining the highest and lowest velocities within a range of distance either side of the measurement distance, means for combining a time sequence of these velocities to determine their rates of change, means for computing a measure of wind shear hazard level from these velocities, their rates of change and the measurement distance and the range of distances associated with the velocities measured at any instant, and means for comparing the measured wind shear hazard level with limits for acceptable wind shear in prevailing conditions.

It will be appreciated that apparatus in accordance with the present invention provides an early warning of wind shear ahead of the sensor, which can be mounted in an aircraft or on the ground, and with suitable apparatus to change the direction of the laser beam. Wind shear can be determined both along and across beam direction. By looking ahead it is possible to determine rates of change before a wind shear reaches the sensor, rather than the delay which must occur if measurements can only be made at the sensor. Also, by knowing at the same instant the maximum and minimum velocities within a range of distances ahead of the required measuring distances, it is possible to distinguish between wind shear and turbulence without any further delay.

Preferably the wind shear hazard level is computed at closely spaced time intervals to take account of changing conditions in wind velocity and, in apparatus for aircraft instrumentation, flight conditions. The measure of wind shear hazard level, or its comparison with limits for acceptable wind shear hazard level is preferrably passed to a display unit, or to a control system for immediate action.

Figure 2:
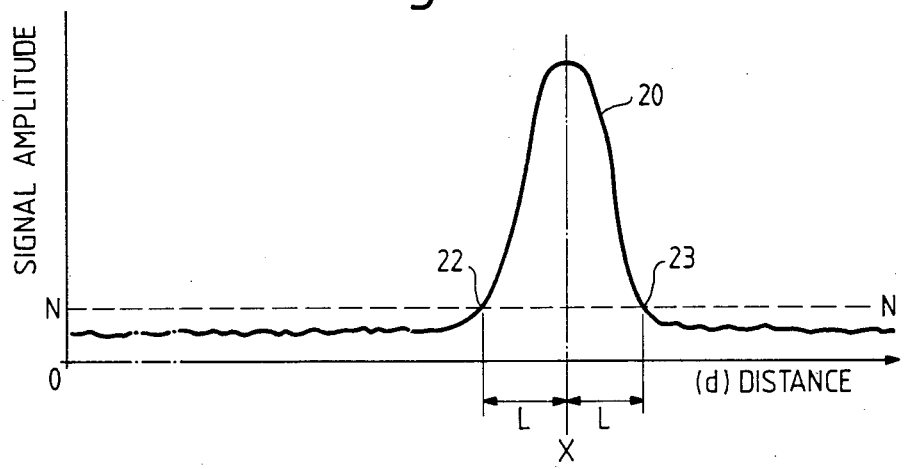
Figure 3:
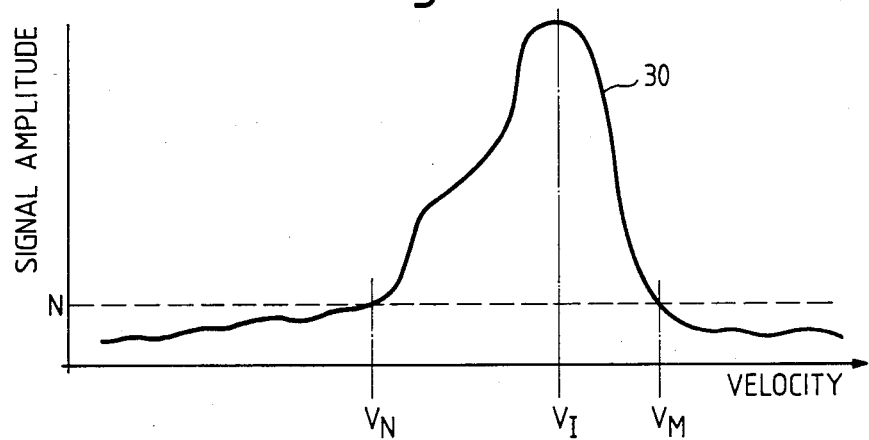
Figure 4:
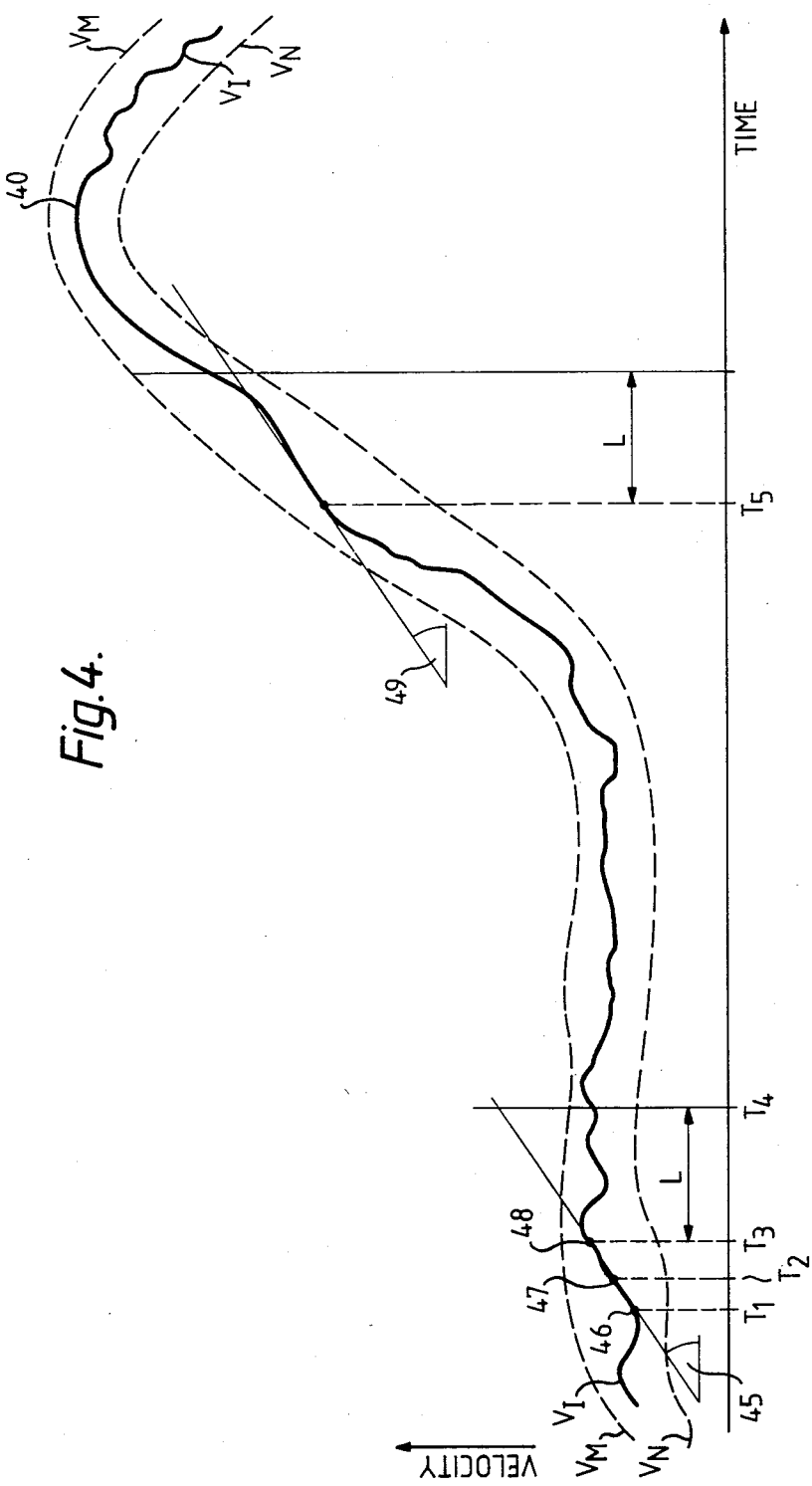

In order that features and advantages of the present invention may be appreciated, an embodiment will now be described by way of example only with reference to accompanying diagrammatic drawings of which:

FIG. 1 represents a block diagram of apparatus in accordance with the present invention for aircraft installation, FIG. 2 represents a distribution of receptions over a measurement length L at a measurement distance X, FIG. 3 represents a velocity transform over the measurement length L, and FIG. 4 represents a time history of instantaneous wind velocities.

Wind shear detection apparatus for installation in an aircraft, 10, includes a forward looking sensor in the form of a laser optical unit, 11. The laser is of the continuous wave type and is optically focussed to a minimum beam width at a point, 14, a measurement distance X ahead of the sensor, 11. Reflections from airborne particles are received by the optical unit, mixed with a proportion of the transmitted laser beam and sensed by a detector in the optical unit, 11. The signal, 12, from the optical unit contains frequency components which are functions of the air velocities in the region about point 14. The nature and operation of the laser unit is described in the literature.

The distribution of receptions, 20 (FIG. 2) from particles a distance, d, from a laser optical unit at O shows a peak at distance X, before falling below noise level N at 22 and 23. Thus information is obtained over a length L either side of the measurement distance OX.

A short time sample of sensor output, 12, is received by spectrum analyser, 15, which, in a further short period performs a velocity transform over the length, 2L. This process is then repeated to give a time sequence of velocity transforms at output line, 16, for transmission to a signal processor, 17. Velocity transform, 30, (FIG. 3) gives no certain information on the location of air with a given velocity within the length 2L. However, it can be shown that changes in velocity at X, where the signal strength is greatest, are most likely to be the same as changes in $V_I$, the peak of the velocity transform, 30. Clearly if the measurement length, 2L, can be reduced, the level of confidence that $V_I$ is the actual velocity at the measurement distance, X, is increased. The apparatus thus far described is known, and to date attempts to obtain improved wind shear detectors have centred on reducing L.

In accordance with the present invention Signal Processor, 17, (FIG. 1) includes means for determining the likely instantaneous velocity $V_I$ at the measurement distance X from the spectrum analyser output signal, 16, and if required, means to improve the signal definition above the noise by adding together a series of output signals, 16. An air velocity against time picture 40 (FIG. 4) may be built up and an indication of rate of change of air velocity, 45, is obtained in the signal processor by differencing a plurality of instantaneous velocity values such as 46, 47, 48 using well known calculation methods. For significant wind shear to be present, this rate of change must exceed a value determined by the aircraft's ability to counter the rate of change. This value may be predetermined, or calculated from flight condition, configuration and power setting in Hazard Limit Computer, 13 (FIG. 1), and provided to the signal processor as a signal 18. Excessive rate of change is not sufficient for wind shear detection as such rates are present in turbulence. Signal processor, 17, includes means for indicating the maximum, $V_M$ (FIG. 3), and minimum, $V_N$, instantaneous velocities within the length 2L. Comparison of combinations of these velocities together with rate of change of $V_I$ against limits, or further calculated values from Hazard Limit Computer distinguish wind shear from turbulence. Means may be provided to reduce any residual signals resulting from turbulence so that signals from the signal processor are suitable for display or for use in a control system.

Examples of the operation of apparatus in accordance with the present invention will now be described.

Signal processor 17 provides an indication of the rate of change of air velocity 45 at the measurement distance X and time $T_2$ from instantaneous velocities ($V_I$) 46, 47, 48 at times $T_1$, $T_2$, and $T_3$. It will be noted that a similar rate of change of velocity 49 is present at time $T_5$. However, it will be appreciated that only turbulence is present at time $T_2$ whereas a potentially dangerous wind shear is present at time $T_5$. For the example presented in FIG. 4 the two conditions are distinguished by the indication of maximum air velocity in the measuring length 2L. At time $T_2$ the maximum velocity $V_M$ differs from the instantaneous velocity $V_I$ by only a small amount, at $T_5$ this difference is large. Thus a combining function of rate of change of instantaneous velocity and the difference between instantaneous velocity and maximum velocity identifies wind shear. This is the case with a wind shear where velocity increases with time. If the velocity in a wind shear decreases with time then the rate of change is negative and the difference between instantaneous velocity and minimum velocity is used to distinguish wind shear from turbulence. It will be appreciated that the ability of the present invention to identify maximum and minimum velocities to a distance L ahead of the measuring point X provides an additional anticipation compared with that available if only the instantaneous velocity at X is known. The forward velocity of the aircraft provides a direct transform from distance to time.

The values of the combining function describes the magnitude of the wind shear and, by comparing this with predetermined (or computed) Wind Shear Hazard Levels for a given aircraft and operating condition, a signal can be provided to a pilot's display, or a control system. The signal to the display can include warning indications.

It will be realised that wind shear detection apparatus in accordance with the present invention provides an early indication of wind shear, allowing maximum time for action to be taken by a pilot following a warning display 100 or by a control system 101. In particular it will be realised that wind shear detection can be achieved as soon as both the predetermined rate of change is exceeded and a maximum velocity in excess of the turbulence velocity limit is present within the velocity transform. In the present example, a warning may be provided at time $T_4$ (FIG. 4) and it will be appreciated that this is significantly earlier than waiting for the shear disturbance to occur at the measurement distance X, and would be the case with prior art systems based on knowledge of $V_I$ only.

A further advantage of the present invention is that the absence of oncoming wind shear within L is reliably established at $T_2$. In prior art systems, this cannot be established until $T_4$.

In accordance with the present invention, the measurement distance, the measurement length and the wind shear limits may be chosen to optimise detection for particular flight conditions, and may, for example be varied in flight as a function of speed, height or throttle setting and aircraft configuration.

Rate of change of velocity may be combined with various combinations of the velocity information available at the same time. For example the difference between $V_M$ and $V_N$ is another function distinguishing wind shear from turbulence.

In embodiments with pulsed laser units instead of focussed CW laser units the length 2L is determined by the shape and duration of the laser pulse and distance X by timing return pulses.

In other respects the principles of wind shear detection described have applied to both types of laser units.

The embodiment and examples of the present invention thus far described are suitable for airborne installation with the object of providing an early warning of wind shear conditions ahead of an aircraft. It will be appreciated that the application of the present invention, however, is not limited to airborne installation. In particular apparatus in accordance with the present invention may be ground based, where the time history of remote instantaneous wind velocity may be built up by performing velocity transformations at different measurement distances.

What is claimed is:

1. Wind shear detection apparatus comprising:
   a forward looking laser air speed sensor providing a signal containing information on air velocity over a range of distance about a measurement distance,
   spectrum analyser means for identifing all velocities present in a time sample of the signal,
   means for determining the instantaneous air velocity ($V_I$) at substantially the measurement distance,
   means for determining the highest velocity $V_M$ and lowest velocity $V_N$ within said range of distances about the measurement distance,
   means for determining differences between said instantaneous air velocity and: (1) said maximum air velocity $V_M$, and (2) said minimum air velocity $V_N$,
   means for determining the rate of change of said instantaneous air velocity $V_I$,
   means for computing a measure of wind shear hazard level from said differences and said rate of change, and
   means for comparing the computed measure of wind shear hazard level with limits for acceptable wind shear in prevailing conditions thereby obtaining an advance warning of dangerous wind shear conditions which exist at said measurement distance.

2. Wind shear detection apparatus as claimed in claim 1 and wherein the wind shear hazard level is re-computed at closely spaced time intervals.

3. Wind shear detection apparatus as claimed in claim 1 further comprising display unit means for displaying the wind shear hazard level, and comparison with limits for acceptable wind shear.

4. Wind shear detection apparatus as claimed in claim 1 further comprising a laser of the continuous wave type.

5. Wind shear detection apparatus as claimed in claim 4 and wherein the laser is of the fixed focus type and is optically focussed to a minimum beam width at the measurement distance.

6. Wind shear detection apparatus as claimed in claim 1 further comprising a hazard limit computer means for computing a wind shear hazard level limit in accordance with the prevailing conditions.

7. Wind shear detection apparatus for airborne installation as claimed in claim 1 further comprising an aircraft control system for receiving said wind shear hazard level, and said comparison with limits for acceptable wind shear.

8. Wind shear detection apparatus for airborne installation as claimed in claim 1 and wherein the measurement distance or wind shear limits may be varied in flight.

9. A method for detecting wind shear, comprising the steps of:
    focusing a forward looking beam at a measurement distance,
    receiving a signal from reflection of said beam containing information on air velocity over a range of distances about said measurement distance,
    identifying all velocities present in a time sample of said signal,
    determining the instantaneous air velocity ($V_I$) at said measurement distance,
    determining the highest velocity $V_M$ and lowest velocity $V_N$ within said range of distances about said measurement distance,
    determining differences between said instantaneous air velocity $V_I$ and: (1) said maximum air velocity $V_M$ and (2) said minimum air velocity $V_N$,
    determining the rate of change of $V_I$,
    computing a measure of wind shear hazard level from said differences and said rate of change, and
    comparing the computed measure of wind shear hazard level with limits for acceptable wind shear in prevailing conditions thereby obtaining an advance warning of dangerous wind shear conditions present in the area of focus of said forward looking beam.

10. Wind shear detection method as in claim 9 further comprising the step or re-computing the wind shear hazard level at closely spaced time intervals.

* * * * *